Patented May 9, 1950

2,507,346

UNITED STATES PATENT OFFICE 2,507,346

BRAZING OF LIGHT METALS

Mike A. Miller, New Kensington, Pa., assignor to Aluminum Company of America, Pittsburgh, Pa., a corporation of Pennsylvania No Drawing. Application September 7, 1946, Serial No. 695,551

2 Claims. (Cl. 148—26)

This invention relates to the brazing of light metals, and relates particularly to fluxes for use in brazing such metals. As used herein, the term "light metal" is intended to refer to aluminum and magnesium and their alloys which contain at least 50% by weight of either metal.

In brazing light metals it is customary to employ a salt flux in addition to a filler metal having a melting point below that of the members being joined. The flux may be provided by coating at least that portion of the parts to be joined with the flux, and then supplying in a furnace, or by means of a torch or by induction, the necessary heat to fuse the flux and the filler metal, or the parts to be joined may be dipped— while in assembled relationship—into a bath of molten flux maintained at a temperature sufficient to cause the filler metal and flux to fuse. The flux serves to remove oxide film and other surface impurities from the metal, and also promotes spreading of the fused filler metal at the joint.

Fluxes have been proposed heretofore which contain various fluorides in addition to chlorides of potassium, sodium, and lithium. However, such fluxes have been subject to one or more of the following objections. Some of the fluorides employed react with one or more of the chlorides mentioned during the brazing operation, and thus reduce the amount of those chlorides available. In some cases, the fluoride employed is relatively expensive. Also, some of the fluorides used have been heavy metal salts that decompose during the brazing operation and leave a deposit of heavy metal at the joint, which may weaken the joint and also increase its susceptibility to corrosion in some situations.

It is an object of this invention to provide a new brazing flux suitable for use in furnace, torch, induction, or dip brazing operations on light metals. It is a further object of this invention to provide a brazing flux containing alkali metal chlorides and a fluoride which does not result in the above mentioned difficulties.

I have found that a flux consisting of a mixture containing (by weight) 5–60% of potassium chloride, 5–60% of sodium chloride, 5–80% of lithium chloride, and 4–12% of aluminum chloride is highly satisfactory for use in brazing light metals, or in brazing light metal to another metal, such as iron or copper. Preferably, the flux contains from 4–8% of aluminum fluoride. Such fluxes are very effective in removing oxide films and other surface films from light metals, result in proper flow of filler metal at the junction between the parts being joined, and do not deposit heavy metal residues at the joints. Moreover, they are free of such fluorine compounds as sodium fluoride, potassium fluoride, cryolite and chiolite, which would react at brazing temperatures with lithium chloride in the flux, except for such amounts of those compounds as may be present as impurities in the above-mentioned ingredients of the flux.

In brazing aluminum or magnesium, the filler metal employed generally has the same base as the metal being brazed. Since ordinarily aluminum and magnesium base alloys do not melt below 950° F., the temperature employed in brazing light metals usually lies between 950° F. and the temperature at which the metal being brazed begins to fuse. Generally, a flux composition which melts at 950 to 1180° F. is satisfactory.

An example of a preferred embodiment of this invention is a flux containing 51% of potassium chloride, 15% of lithium chloride, 28% of sodium chloride, and 6% of aluminum fluoride. Such a flux is completely liquid at a temperature as low as 1033° F. and thus is suitable for relatively low-temperature brazing of aluminum and magnesium and their alloys. By varying the proportions of the various compounds within the ranges described above, other fluxes can be produced for use at different minimum brazing temperatures which are best suited to the particular brazing temperatures to be employed.

I claim:

1. A brazing flux consisting of 5 to 60% of potassium chloride, 5 to 60% of sodium chloride, 5 to 80% of lithium chloride, and 4 to 12% of aluminum fluoride.

2. A brazing flux consisting of 5 to 60% of potassium chloride, 5 to 60% of sodium chloride, 5 to 80% of lithium chloride, and 4 to 8% of aluminum fluoride.

MIKE A. MILLER.

REFERENCES CITED

The following references are of record in the file of this patent:

UNITED STATES PATENTS

| Number | Name | Date |
|---|---|---|
| 2,112,578 | Rohrig | Mar. 29, 1938 |
| 2,396,604 | Reimer | Mar. 12, 1946 |

FOREIGN PATENTS

| Number | Country | Date |
|---|---|---|
| 108,527 | Switzerland | Jan. 16, 1925 |

Certificate of Correction

Patent No. 2,507,346 — May 9, 1950

MIKE A. MILLER

It is hereby certified that error appears in the printed specification of the above numbered patent requiring correction as follows:

Column 1, lines 48 and 49, strike out the word "chloride" and insert instead *fluoride*;

and that the said Letters Patent should be read with this correction therein that the same may conform to the record of the case in the Patent Office.

Signed and sealed this 1st day of August, A. D. 1950.

[SEAL]

THOMAS F. MURPHY,
*Assistant Commissioner of Patents.*